Patented Oct. 12, 1948

2,451,445

UNITED STATES PATENT OFFICE 2,451,445

MANUFACTURE OF DENSE PRODUCTS FROM CEMENT MATERIAL

Joseph R. Parsons, Chicago, Ill., assignor to United States Gypsum Company, Chicago, Ill., a corporation of Illinois No Drawing. Application September 6, 1943, Serial No. 501,428

2 Claims. (Cl. 106—110)

The present invention relates to improvements in the manufacture of dense products from inorganic materials such as clay, cement, gypsum and the like, so as to produce either brick or building materials, porcelain or other forms of ceramic materials.

One of the primary objects of the invention is to permit the production of shaped masses of inorganic substances made up essentially of a finely comminuted solid on the one hand and a gauging liquid on the other, using for this purpose only a minimum amount of liquid, so as to avoid the necessity of drying from the resulting product any large quantities of water, if water be the gauging liquid used.

A further object of the invention is to enable the uniform wetting of a finely comminuted solid with a minimum quantity of a liquid, by the expedient of rendering the said liquid much lighter in density, or, as it may also be expressed, greatly expanding its volume relative to its weight, by incorporating with the liquid a large number of therewith emulsified gaseous bubbles.

A further object of the invention is to distribute throughout a mass of finely comminuted solid material some modifying ingredient in small amounts such as colors, binders, fluxes, etc., while at the same time securing its uniform distribution; this being accomplished by admixing the small amount of material to be distributed with a gauging liquid which has had incorporated with it a large number of gaseous bubbles which therefore act as a sort of lubricant, which not only enables the liquid to penetrate to all parts of the dry comminuted solid with which it is mixed, but will at the same time carry and uniformly distribute the desired modifying ingredient throughout the mass of comminuted solid.

More specifically, the invention is applicable, for instance, to the manufacture of very dense gypsum castings; this being accomplished by mixing with calcined gypsum, for example, a relatively small amount by weight of water or other suitable gauging fluid, which latter, however, has been greatly expanded in volume by having a large number of gaseous bubbles incorporated therewith.

As hereinafter described in further detail, such a mixture will form a damp mass which lends itself to compression molding, and wherein the water added will combine with the calcined gypsum with the formation of calcium sulfate dihydrate, which causes the mixture to set. By reason, however, of the fact that only a small amount of water has been used, there will be practically no necessity for drying the resulting cast or molded product.

The invention, of course, is equally applicable to the manufacture, for instance, of dry pressed brick or other analogous ceramic material in which clay is substituted for the gypsum, thereby producing a damp moldable mixture with but a minimum amount of water which is nevertheless quite evenly distributed throughout the clay. Such a procedure is of particular value in making pressed porcelain products.

By substituting other setting materials, such as Portland cement, Sorrel cement and the like, other inorganic pressed products can be made with minimum amounts of water.

It will be obvious of course that by using somewhat larger amounts of water—but by no means as large as have hitherto been used—moldable or castable slurries can be produced.

The invention is predicated upon the discovery that the relative fluidity and/or plasticity of a mixture of a liquid and a finely divided solid depends to some extent upon the relative density of the liquid used.

In other words, if, for example, a certain type of solid requires normally, say, 60 parts by weight of water to form with it a fluid slurry, while smaller amounts would only dampen the mass, yet if one were to use, instead of 60 parts of liquid, say only 30 parts, but were to expand these 30 parts to a volume equivalent to the 60 parts or greater, as by introducing permanent gaseous bubbles therein, the same degree of viscosity or moldability would be obtained as with the much larger quantity (60 parts) so long as some part of the bubble structure of the gaseous emulsion were maintained.

Thus, while it has already been proposed to produce tenacious foams and to mix these with previously prepared cementitious slurries for the purpose of producing light weight expanded products, it apparently has occurred to no one prior to the work of the present applicant to produce dense materials by the expedient of lessening the weight of a gauging fluid by having it composed in part by a gaseous rather than a liquid fluid.

For the purposes of illustration a number of examples of applying the principles of the present invention will now be given.

*Example 1*

For the purpose of this example, ordinary so-called molding stucco is employed. This is a commercial form of calcined gypsum, that is to say, calcium sulfate hemihydrate, made by calcining gypsum. Ordinarily this material, in order to produce a readily moldable slurry, would require 63 cubic centimeters or grams of water for every 100 grams of the stucco. This ratio is often spoken of in this industry as the "consistency" of the plaster or stucco. More accurately the consistency is defined as the number of cubic centimeters of water required to be added to 100 grams of the plaster to yield a slurry which will just pour from a cup. Inasmuch as the setting of the gypsum involves the addition to the hemihydrate of the equivalent of one half molecule of water to form the calcium sulfate dihydrate, it will be self-evident that by using 63 parts by weight of water to 100 parts by weight of the plaster, that this will introduce into the mixture an enormous excess of water which after the mass has set, has to be removed by drying. This is both time consuming and expensive. Now, if it were possible to add to the plaster only the theoretically required amount of water, which would then combine with the hemihydrate to form a set mass of gypsum, this would be an ideal condition. Thus, for example, as little as 20 grams of water will more than suffice to effect the setting. However, it is a physical impossibility to mix only 20 parts of water with a plaster or stucco having the consistency of 63. In fact, such an amount of water will not even thoroughly wet the 100 grams of plaster or stucco. If an attempt is made to blend 20 grams of water with 100 parts of stucco, the water will wet about 35 or 40 grams of it while the rest of the plaster will remain dry. Applicant, however, has made the rather remarkable discovery that if he adds to, say, 20 parts of water, a small amount of a surface tension reducing agent, such as for example, saponin or other wetting agent, he can then expand the volume of these 20 grams of water to about 80 to 100 c. c. by incorporating small bubbles of air with it. This can be accomplished by emulsifying the air with the liquid as, for example, by whipping it, thereby producing an emulsion of disperse small air bubbles in the liquid. In other words, one will then have, let us say, from 80 to 100 cubic centimeters of greatly expanded liquid which nevertheless weighs only about 20 grams.

At the same time, if desired, there can be incorporated with the liquid small amounts of modifying agents which, if an attempt were made to mix them dry with the stucco, could not possibly be distributed evenly therewith. However, if 100 grams of stucco are mixed with from 80 to 100 cubic centimeters of the gaseous emulsion, this will uniformly wet all of the 100 grams of the stucco, apparently because of the lubricating effect and the large surface area furnished by the air bubbles in the emulsion, which seem to act as a lubricating means. The resultant mixture will represent a somewhat damp mass, which can readily be formed into any desired shape, as by press molding. If pressure is used, then upon setting an extremely heavy and dense product will be obtained. But even without pressure the product produced by setting is much denser than would be the case if enough water had been used in the first place to produce either a moldable or castable mixture.

It will at once be seen that the present invention differs very radically from the idea of producing cellular, porous or light weight materials by incorporating foam with a previously prepared cementitious slurry. In such cases, as has been done in the prior art, the total volume of the slurry itself is increased practically in the exact ratio of the volume of the added foam, with the result that more water is introduced into the mixture, and that the resulting product is very light in weight, but is not endowed with any great strength.

On the other hand, and by contrast, the present invention embodies the production of extremely dense materials without the necessity of employing special types of gypsum plasters, such as for example, the low consistency plasters described in the patent to Randel and Dailey, No. 1,901,051. The gypsum of this Randel and Dailey patent has a normal consistency of say 30 to 42 cubic centimeters, thereby inherently producing dense casts. However, the present invention is also applicable for use with this type of special low consistency gypsum plaster by the expedient of using only about one-half as much water as is indicated by the normal consistency of the Randel and Dailey gypsum plaster, thus producing even denser casts than can be produced without the use of applicant's invention. Casts thus produced are of rock-like consistency, of extreme strength, and mechanical resistance, which are further improved if pressure is used. In fact, only the theoretical quantity of water necessary for hydration and crystallization need be used.

*Example 2*

The application of the present invention to the ceramic field is exemplified by the following:

| Formula | A | B |
|---|---|---|
| Kaolin_____grams__ | 600 | 600 |
| Grog, thru 8 on 30 mesh screen (crushed fire brick) grams__ | 400 | 400 |
| Bentonite_____do____ | 10 | 10 |
| Water_____c. c__ | 100 | 100 |
| Soap Bark_____grams__ |  | 1 |
| Weight per cu. ft. after pressing_____pounds__ | 124.1 | 131.1 |

This example deals with the manufacture of a dry-pressed refractory brick made from kaolin, grog, bentonite and water which had been expanded by the incorporation of gaseous bubbles. For purposes of comparison, a similar brick was made up from the same amount of ingredients and water, but without the incorporation of bubbles, and it was found that the brick thus made was actually less dense than the one which had been made with the bubbles in the water. In each case the brick was pressed under a pressure of about 1500 lbs. per square inch.

The column headed "A" therefore represents prior-art procedure, while column "B" is exemplificative of the present invention. In making up batch "A," the dry bentonite was first mixed with the dry clay and grog, whereupon the water was added and the entire mixture blended for about one minute in a Hobart mixer, using the second speed thereof. In batch "B," however, the 100 cubic centimeters of water containing the soap bark was entirely converted into a gaseous emulsion to which the bentonite was then added dry. The resulting mixture was a foamy mass having about four times the volume of the water. The dry clay and grog were then added to this foamy mass, mixed for one minute in the Hobart mixer at its second speed, and then pressed. It will be noted that the difference in weight is about 7 lbs. per cubic foot, which is quite considerable when it is considered that the true weight per cubic foot of these materials in the formula shown is about 145 lbs. per cubic foot. The pressed brick forms made from batches "A" and "B" were then burned in the usual manner. The final products had the densities indicated on the above table, the one made with the gaseous emulsion having the higher density.

Example 3

A very strong and dense cementitious mass may be produced by mixing water, into which gaseous bubbles have been introduced, with dry cement followed by molding the resulting mixture. The amount of water required is only about one-half to one-third that ordinarily required to produce a moldable mass, because the presence of the gaseous bubbles insures the thorough blending of the dry cement with the emulsion, and aids mobility of the plastic mass. The products produced are not porous, but on the contrary very dense, and after setting are endowed with great strength.

Example 4

The extension of the principles of the present invention to the making of molds from foundry sand is exemplified by the following example, which compares a wet foundry sand, as received, with the same sand after drying and making up with water on the one hand, and with water containing emulsified gaseous bubbles on the other. Comparisons were made on the basis of tensile strength, as this is the most important property in making molds of this character. As received, the foundry sand when made up into standard testing briquettes and dried showed a tensile strength of 2.49 lbs. per square inch. The drying of the briquettes was effected at temperatures above 212° F.

A set of briquettes was made up from 1000 grams of dried foundry sand, 10 grams of bentonite, which was mixed in dry, and 140 cubic centimeters of water, which latter amount was found necessary to bring the sand to the same degree of workability as received. The water was blended with the sand and bentonite mixture for one minute in a Hobart mixer at its second speed. After forming into briquettes, and drying the latter as aforesaid, these had a tensile strength of 4.02 lbs. per square inch.

In the third test, and incorporating the principles of the present invention, 1000 grams of dried foundry sand were taken. 140 cubic centimeters of water containing 1 gram of soap bark were converted into a foamy mass to which the dry bentonite was then added. The volume of the mass thus obtained was about 400 cubic centimeters. The dry sand was then blended with this in the Hobart mixer for one minute, with the mixer again running at its second speed. The strength of the dried briquettes made from this mixture was 5.65 lbs. per square inch.

This therefore shows the great increase in strength obtainable by the practice of the present invention.

Example 5

To demonstrate conclusively that the effects obtained cannot be attributed merely to the wetting effect of the emulsifying agents employed, tests were made with Portland cement. A gaging water containing 2 grams of a well known wetting agent (M. P. 189) was prepared, and 500 grams of Portland cement were gaged with it without first foaming the water by whipping air into it. The consistency was found to be 34 cubic centimeters; i. e. it required this much of the gaging water to make a pourable mixture with the 500 grams of cement. A quantity of the gaging liquid was then thoroughly whipped so as to expand its volume about four times. Under these conditions only 26 cubic centimeters (on the original basis) of gaging water was required. This constitutes a reduction of consistency of 8 cubic centimeters, or, on the basis of the original 34 cubic centimeters, of 23.5%.

From the foregoing examples the general nature of the invention will, it is believed, be thoroughly understood, but it is also self-evident that these examples are by no means to be taken as limitations upon the invention for which applicant claims:

1. Process of producing dense castings from a cement and a liquid capable of combining with said cement to produce a set product which comprises mixing a given quantity of dry cement with an amount, by weight, of said liquid far less than the amount corresponding to that of the normal consistency of said cement, said liquid containing dispersed therein a sufficient quantity of gaseous evanescent and readily collapsible bubbles to give said weight of liquid an apparent effective volume substantially equal to that of the quantity of liquid corresponding to the normal consistency of said cement, thereby to impart to the mixture a degree of flowability substantially as great as that of the same amount of cement when mixed with an amount of liquid equal in amount to that of its normal consistency, casting the resulting mixture into shape with concomitant destruction of said bubbles while the casting is still plastic, and permitting it to set and harden.

2. The process of claim 1 in which the cement is a calcined gypsum.

JOSEPH R. PARSONS.

REFERENCES CITED

The following references are of record in the file of this patent:

UNITED STATES PATENTS

| Number | Name | Date |
|---|---|---|
| 1,806,250 | Hack | May 19, 1931 |
| 2,053,842 | Rice | Sept. 8, 1936 |
| 2,283,192 | Ditto | May 19, 1942 |
| 2,292,012 | Parsons | Aug. 4, 1942 |
| 2,337,915 | Menger et al. | Dec. 28, 1943 |

FOREIGN PATENTS

| Number | Country | Date |
|---|---|---|
| 487,259 | Great Britain | 1938 |